/ 
United States Patent Office 2,981,741
Patented Apr. 25, 1961

2,981,741

ARYL GUANIDINE-PARAFORMALDEHYDE REACTION PRODUCT

Howard M. Buckwalter and Joseph M. Almand, Detroit, Mich., assignors to United States Rubber Company, New York, N.Y., a corporation of New Jersey No Drawing. Original application May 21, 1956, Ser. No. 585,962, now Patent No. 2,927,051, dated Mar. 1, 1960. Divided and this application Aug. 17, 1959, Ser. No. 838,377

2 Claims. (Cl. 260—333)

This invention is concerned with compositions and processes for adhering textiles to rubbers. More specifically, the invention involves compositions and processes for improving the carcass life of pneumatic tires.

In certain rubber articles designed to withstand considerable stresses in use, the rubber is reinforced with comparatively inextensible textile materials. Thus, rubber hose, belts and tires are commonly reinforced with filamentary textiles in the form of yarns, cords or fabric. In such articles, it is important that the textile reinforcing material be firmly adhered to the rubber and remain effectively adhered even after the article has been subjected to repeated varying strains in use, because any separation and relative movement of the rubber and textile parts leads to abrasion between these parts and consequent early failure.

The prior art methods and materials for adhering textiles to rubber have had a number of shortcomings, and there has therefore been a continuing desire for more efficient and satisfactory methods of providing the required adhesion, as evidenced by the large number of adhesive preparations in commercial use as well as the growing volume of technical and patent literature on this subject.

The problem of providing adequate adhesion in an efficient manner has been particularly acute in the case of pneumtic tires. The best previously known method of adhering tire cord to the rubber carcass stock has been to apply to the cord a solution comprising rubber latex (butadiene-vinylpyridine copolymer latex being especially suited for this purpose) together with a partially condensed resorcinol-formaldehyde resin and an agent capable, upon heating, of liberating additional formaldehyde in amount sufficient to complete the condensation of the resin. The tire cord was passed through such a solution in the form of a webbed fabric or cord fabric, leaving a deposit not only on the exterior surface of the cord but also substantially penetrating into the interstices of the cord. After passing from the solutioning apparatus the cord was introduced into a long drying and curing oven wherein the water was evaporated from the deposited solution and at the same time the partially condensed resorcinol-formaldehyde resin reacted with the formaldehyde liberated by the formaldehyde-yielding agent, thereby advancing the resin to a more highly condensed state. Upon completion of such drying and curing operation, the cords, which are now stiff because of the resin deposit, were passed through the usual calender, where a thin skim coat of vulcanizable rubber carcass stock was applied to the cord. The resulting rubberized tire fabric was used to build up the raw tire casing in the usual way, and the entire assembly was subsequently cured in the usual tire mold.

The conventional tire cord solutioning process not only requires extensive equipment that is expensive to install and maintain, but there also are inherent disadvantages in the process as a consequence of the physical and chemical nature of the adhesive solution. The latex bath is comparatively unstable and tends to deposit an undesirable coagulum over a period of time. The resorcinol-formaldehyde resin must be prepared and used with great care to provide consistent adhesion. Even when exercising careful controls, variable results are frequently noticed. The efficacy of the adhesive solution changes unpredictably with age. The drying and curing steps are of necessity time-consuming. Undesirable stiffness is imparted to the cord fabric due to penetration of the latex-resin solution into the interior of the cords, where solid material is thus deposited to the detriment of the flexibility and fatigue life of the cords. The performance of the finally resulting rubber-textile laminate in the finished tire leaves much to be desired, not only from the standpoint of adhesion, but with respect to other characteristics as well, particularly fabric fatigue.

Accordingly, a principal object of the present invention is to provide a new and improved composition useful for adhering textile materials to rubber, and a method of making such composition.

Another object is the provision of a composition useful for adhering textiles to rubber that makes possible remarkably improved fatigue life in the textile.

Another object of the invention is to provide a composition that makes it possible to adhere textiles to rubber with greater tenacity than has heretofore been readily attainable.

The manner in which the invention realizes the foregoing and other objects and advantages will be made clear in the following detailed description.

In essence, the invention comprises the preparation of certain adhesive-forming components, which may be incorporated into vulcanizable rubber stocks. These rubber stocks subsequently may be applied to the textiles, and the textile-rubber composites thereafter subjected to rubber vulcanizing conditions.

The textile-rubber adhesive-forming components comprise resorcinol in conjunction with certain aryl-substituted guanidine-formaldehyde reaction products. Neither the resorcinol nor the aryl guanidine-formaldehyde reaction product function, per se, as an adhesive agent. However, when employed conjunctionally in a rubber stock, or by methods described in patent application Serial No. 389,118 to Buckwalter et al., now U.S. Patent No. 2,746,898 they react chemically under rubber-vulcanizing conditions. During the course of the reaction an adhesive bond is established between the textile and the rubber.

The guanidines that may be reacted with formaldehyde to yield adhesive-forming compounds with resorcinol include 1,3-diaryl derivatives having the general formula:

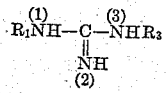

wherein $R_1$ and $R_3$ are aryl radicals, e.g., phenyl; tolyl; 1,3-diphenyl; 1,3-di-(o, m or p) tolyl; 1-phenyl-3-(o, m or p) tolyl; etc.

PREPARATION OF ARYL GUANIDINE-PARAFORMALDEHYDE REACTION PRODUCTS

The solid reactants are intimately blended at room temperature in the relative proportions of 1 molar equivalent of the 1,3-diaryl guanidine to 2-3 molar equivalents of formaldehyde in the form of paraformaldehyde.[1] The reaction mixture is heated at 90-95° C. until it becomes fluid. A mechanical stirrer is then introduced and during vigorous agitation in an open reactor, the temperature of the reaction mixture is raised to 130°-150° C. The reaction is complete when one molar equivalent of water is cleaved for each molar proportion of aryl guanidine present in the original reaction mixture and a free formaldehyde content of the product is less than 1% or, preferably, zero.

ALTERNATIVE METHOD OF PREPARATION

As an alternative method of preparation, aqueous formaldehyde, e.g., 37% formalin, may be used instead of paraformaldehyde. For example, one molar equivalent of the 1,3-diaryl guanidine is slowly added, with stirring, to formalin containing 5-10 molar equivalents of formaldehyde. The reactants are then allowed to stand for several hours at room temperature. The aqueous portion of the reaction mixture is removed by decantation from the insoluble intermediate reaction product and the latter is then processed at 130°-150° C. under the conditions described above for the preparatory method employing paraformaldehyde.

The products, obtained in about 80% yield, are amber-colored, odorless, non-crystalline, pulverulent solids, having melting points of 60-80° C. They are soluble in common organic solvents and in mineral acids.

The products are believed to be essentially cyclic condensation dimers of 1,3-bis (hydroxymethyl) 1,3-diaryl guanidines. The structure is given below:

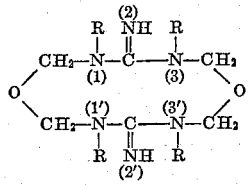

where R is an aryl radical, such as phenyl, tolyl, etc.

The adhesive-forming chemicals described above, namely, resorcinol and the 1,3-diaryl guanidine-formaldehyde reaction product may be incorporated into vulcanizable elastomeric materials on conventional-rubber-compounding equipment such as a mill or Banbury. Whatever mixing method may be selected, it is essential for optimum results that the temperature of the stock during mixing and throughout all subsequent operations does not exceed that at which the resorcinol and the 1,3-diaryl guanidine-formaldehyde reaction is initiated. Depending on the time and concentration of the reactants in the rubber mix, temperatures as high as 280° F. may be tolerated.

Although mixing procedures may be varied somewhat, a preferred method comprises the addition of one of the above components at the beginning, and the other of the components at the end or near end of the mixing cycle.

The classes of textile fibers or filaments that can be adhered to rubbers by use of the composition herein described include native cellulose (e.g., cottons), regenerated cellulose (e.g., rayons), and synthetic linear polyamides (e.g., nylons). The form into which the fibers may be manufactured is immaterial. For example, they may take the form of unspun staple, simple or complex spun yarns, cords, woven fabrics, etc.

---

[1] Reversible addition reactions start immediately at room temperature upon contact and proceeds with time and increasing temperatures in the direction of 1,3-dimethylolation of guanidine. Upon standing at room temperature for a period of 24-48 hours the freshly blended reactants "set," accompanied by a 4-5 fold increase in bulk density, to yield a hard, friable intermediate reaction product which may be stored indefinitely for subsequent condensation at or above 130° C.

The classes of vulcanizable rubbers to which the textiles can be adhered include natural rubber (Hevea); synthetic rubbers made by emulsion copolymerization of butadiene-1,3 with styrene, e.g., GR-S, oil extended GR-S; rubber reclaim compositions; etc.

Resorcinol (I) may be introduced into the rubber, or carbon black masterbatch, in its commercially available solid form, as a concentrated aqueous solution, or as a rubber masterbatch. After the introduction of (I) curing aids, accelerators, antioxidants, etc., are then added and are followed by the addition of 1,3-diaryl guanidine-formaldehyde reaction products (II) (granular or powder) and finally sulfur. Table I shows the preferred amounts of (I) and (II) and their practical limits, expressed as parts by weight per 100 parts of rubber hydrocarbon, required for obtaining optimum results.

Table I

|  | Preferred Pts. | Minimum Pts. | Maximum Pts. |
| --- | --- | --- | --- |
| Rubber H.C. | 100 | 100 | 100 |
| Curative, etc. | x | x | x |
| (I) | 2.4-4.0 | 1.2 | 6.0 |
| (II) | 6.0-10.0 | 3.0 | 15.0 |

The ratio of I/II should preferably be from 0.3 to 0.5. A ratio of about 0.4 has been found to be most satisfactory.

Owing to the variable composition of rubbers, the diversity of rubber-compounding chemicals, and of compounding practice, it may be necessary to establish by experiment the optimum quantities of (I) and (II) and of curatives etc., that are required for the adequate performance of a given end product.

Vulcanizable rubber stocks containing the adhesive-forming chemicals described above can be reinforced with untreated textiles in the several manufactured forms noted earlier. For example, this sheets or webs of staple fiber in a random or an oriented state may be coated on one or both sides with the adhesive stock to yield non-woven textile-reinforced rubber; or, the fiber may be incorporated into the rubber by milling, etc., and subsequently sheeted to the desired gauge. When the textile reinforcement is in the form of yarn, cord, woven and weftless fabrics, etc., the rubber coating is applied preferably by passage through a four-roll calender. Although the adhesive-compounded rubber stocks herein disclosed are primarily designed for direct application to grey or untreated textiles, they may be applied, if desired, to textiles previously treated with fluid adhesive compositions.

In many textile-reinforced rubber products there are, in addition to the reinforced rubber stock, special purpose non-reinforced stocks which overlie and have a common boundary or interface with the reinforced rubber. For example, a pneumatic tire contains a reinforced rubber carcass which is overlain by special purpose rubber elements such as tread stock, sidewall stock, liner stock (tubeless tires), etc. In the event that physical or chemical incompatibility exists between the textile-reinforced adhesive-compounded stock and the contiguous, non-reinforced, special purpose stocks, the incompatibility can be minimized by incorporating predetermined amounts of (I) and (II) into the latter.

The improvements effected in the mechanical stability of rubber-tire cord textile laminates by incorporating the adhesive-forming chemicals into the rubber stock are shown in Tables II-V. The results, expressed as dome life, are a measure of the relative resistance of a simulated tire carcass toward ply separation when subjected to severe dynamic strains at temperatures which equal or exceed those attained by tires operating under service conditions. The test data were obtained on the apparatus described in U.S. Patent No. 2,666,119 to Ernest B. Dodge.

Table II (I) = Resorcinol.
(II) = 1,3-diphenylguanidine - paraformaldehyde reaction product.
Textile = Viscose rayon.
Base rubber stock = Rubber reclaim.

| Example | Dome Life (mins.) | Adhesive in Rubber Pts. | | Latex Adhesive on Textile, Percent |
|---|---|---|---|---|
| | | (I) | (II) | |
| 1 | 71 | None | None | 6-9 |
| 2 | 218 | 2.4 | 6.0 | None |
| 3 | 245 | 4.0 | 10.0 | None |
| 4 | 279 | 6.0 | 15.0 | None |

Table III (I) = Resorcinol.
(II) = 1,3-diphenylguanidine - paraformaldehyde reaction product.
Textile = Nylon.
Base rubber stock = Hevea.

| Example | Dome Life (mins.) | Adhesive in Rubber Pts. | | Latex Adhesive on Textile, Percent |
|---|---|---|---|---|
| | | (I) | (II) | |
| 5 | 160 | None | None | 5-7 |
| 6 | 532 | 2.4 | 6.0 | None |
| 7 | 605 | 4.0 | 10.0 | None |
| 8 | ¹1,015 | 2.4 | 6.0 | None |

¹ Nylon cord hot stretched prior to coating with rubber stock.

Table IV (I) = Resorcinol.
(II) = 1,3-diphenylguanidine-formalin reaction product.
Textile = Viscose rayon.
Base rubber stock = Rubber reclaim.

| Example | Dome Life (mins.) | Adhesive in Rubber Pts. | | Latex Adhesive on Textile, Percent |
|---|---|---|---|---|
| | | (I) | (II) | |
| 9 | 71 | None | None | 6-9 |
| 10 | 210 | 2.4 | 6.0 | None |

Table V (I) = Resorcinol.
(II) = 1,3-di-o-Tolylguanidine-paraformaldehyde reaction product.
Textile = Viscose rayon.
Base rubber stock = Rubber reclaim.

| Example | Dome Life (mins.) | Adhesive in Rubber Pts. | | Latex Adhesive on Textile, Percent |
|---|---|---|---|---|
| | | (I) | (II) | |
| 11 | 71 | None | None | 6-9 |
| 12 | 190 | 4.0 | 10.0 | None |

While one of the preferred methods of our invention comprises mixing the resorcinol and the 1,3-diaryl guanidine-formaldehyde reaction product directly with the rubber stock as described previously, we are not limited to this specific method. Thus, our invention may be carried out by placing the resorcinol and the 1,3-diaryl guanidine-formaldehyde reaction product on the surface of the textile material, or on the surface of the rubber stock, or either one of the components may be placed on the textile surface while the remaining component is placed on the rubber surface.

Thus, in more detail, one of the adhesive-forming chemicals, such as the resorcinol, may be mixed with the rubber stock, and the other component, the 1,3-diaryl guanidine-formaldehyde reaction product, is applied to the textile.

Regardless of the method of applying the adhesive-forming components to the rubber or to the textile or both, it is essential that the textile and the rubber be brought together before the resorcinol and 1,3-diaryl guanidine-formaldehyde reaction product reacts with each other. During the subsequent vulcanization of the rubber, these two components react to form an excellent adhesive bond between the textile and the rubber.

From the preceding data it will be apparent to those skilled in the art of tire manufacture that the invention affords an unusually effective and convenient way of forming the required adhesive bond between the tire fabric and the rubber carcass stock.

It should be noted that one advantage of the present invention resides in the use of 1,3-diaryl guanidine-formaldehyde reaction products as one of the adhesive-forming components. This reaction product is non-volatile, so that at the reacting temperatures, there is no danger of evolution of any noxious or toxic vapors.

Another advantage of the present invention is that the use of these aryl guanidine-formaldehyde reaction products elevates the initiation reaction temperature with resorcinol above conventional mixing temperatures. Therefore, no special precautions are required during the mixing operation except as noted in column 3, lines 49–56, and it becomes commercially feasible to compound rubber stocks with the adhesive-forming components at or near the standard milling temperatures (230–280° F.).

This is a continuation-in-part of our above-mentioned copending application Serial No. 389,118, filed October 29, 1953, now U.S. Patent No. 2,746,898, and a division of our copending application Serial No. 585,962, filed May 21, 1956, now U.S. Patent No. 2,927,051.

Having thus described our invention, what we claim and desire to protect by Letters Patent is:

1. A chemical having the formula

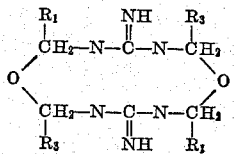

where $R_1$ and $R_3$ are aryl radicals selected from the group consisting of phenyl and (o, m and p) tolyl.

2. The method of preparing an aryl guanidine-paraformaldehyde reaction product comprising intimately blending a reaction mixture consisting of a solid 1,3-diaryl guanidine, said aryl radicals being selected from the group consisting of phenyl and (o, m and p) tolyl, with solid paraformaldehyde, the paraformaldehyde being present in such quantity that 2 to 3 molar equivalents of formaldehyde are provided for each molar equivalent of 1,3-diaryl guanidine, heating the reactants at a temperature of 90–95° C. until they become fluid, raising the temperature of the reaction mixture to from 130° to 150° C. and providing vigorous agitation, to thereby cleave one molar equivalent of water for each molar proportion of the 1,3-diaryl guanidine present in the original reaction mixture, the reaction being completed when the free formaldehyde content of the reaction product is less than 1%.

References Cited in the file of this patent

UNITED STATES PATENTS 2,412,801    Davis    Dec. 17, 1946

OTHER REFERENCES

Geigy: Chem. Abs., vol. 44, p. 848 (1950).